Figure 1:
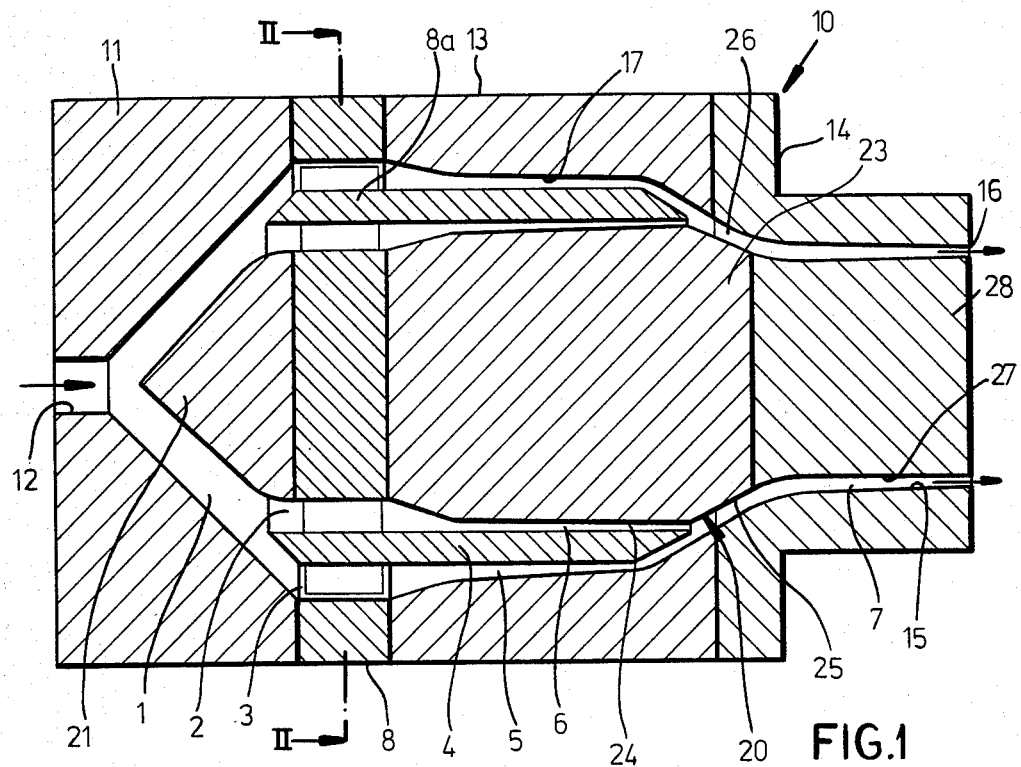

United States Patent [19]

Ratheiser

[11] Patent Number: 4,509,907
[45] Date of Patent: Apr. 9, 1985

[54] EXTRUSION HEAD FOR TUBULAR BODIES AND HOLLOW PROFILES

[75] Inventor: Heinz Ratheiser, Vienna, Austria
[73] Assignee: American Maplan Corporation, McPherson, Kans.
[21] Appl. No.: 494,248
[22] Filed: May 13, 1983
[51] Int. Cl.³ .............................................. B29F 3/04
[52] U.S. Cl. ................. 425/197; 264/209.8; 425/380; 425/467
[58] Field of Search ............... 425/467, 461, 380, 197; 264/209.8, 173

[56] References Cited

U.S. PATENT DOCUMENTS

| | | | |
|---|---|---|---|
| 2,141,776 | 12/1938 | Vautier et al. | 264/173 |
| 2,345,086 | 3/1944 | Becker et al. | 425/380 |
| 3,146,495 | 9/1964 | Sanford | 425/380 |
| 3,266,092 | 8/1966 | Corbett | 264/209.8 |
| 3,357,050 | 12/1967 | Criss | 425/461 |
| 3,709,645 | 1/1973 | Mraz | 425/467 |
| 3,899,276 | 8/1975 | Sokolow | 425/380 |
| 4,045,154 | 8/1977 | Ratheiser | 264/209.8 |
| 4,054,403 | 10/1977 | Hornbeck et al. | 264/173 |
| 4,063,865 | 12/1977 | Becker | 425/380 |
| 4,157,194 | 6/1979 | Takahashi | 264/173 |

FOREIGN PATENT DOCUMENTS

| | | | |
|---|---|---|---|
| 1902784 | 8/1970 | Fed. Rep. of Germany | 264/209.8 |
| 1933920 | 1/1971 | Fed. Rep. of Germany | 425/466 |
| 1940195 | 3/1971 | Fed. Rep. of Germany | 425/380 |
| 2232774 | 1/1974 | Fed. Rep. of Germany | 425/380 |
| 2446421 | 4/1976 | Fed. Rep. of Germany | 425/467 |

Primary Examiner—Jeffery Thurlow
Attorney, Agent, or Firm—Karl F. Ross; Herbert Dubno

[57] ABSTRACT

An extrusion head for producing hollow profiles such as thick-wall large diameter PVC pipe has its flow channel divided by a hollow mandrel into two coaxial portions of a flow cross section greater than that of the common portion of the flow channel downstream of these coaxial portions and running through the mouth of the head. According to the invention, the flow channel progressively diminishes the flow section over the length thereof at least from the plate at which the coaxial portions start to eliminate structural defects caused by failure of the streams of synthetic resin to adequately merge.

9 Claims, 2 Drawing Figures

EXTRUSION HEAD FOR TUBULAR BODIES AND HOLLOW PROFILES

FIELD OF THE INVENTION

My present invention relates to an extrusion head and, more particularly, an extrusion head for extruding a continuous strand of a hardenable synthetic resin material, so as to form so-called hollow profiles and tubular bodies.

BACKGROUND OF THE INVENTION

The term "hollow profiles" is used herein to refer to peripherally closed structures of substantially uniform wall thickness surrounding a closed space, i.e. a tube of any selected cross section, e.g. a circular cross section as in a pipe or a polygonal cross section or some combination of polygonal and curved cross sections. It is also intended to refer to a structure wherein a space is bounded by a part having substantially uniform wall thickness, e.g. a channel with polygonal or curved sections. Hence the term is generally used to refer to any extruded structure having a substantially uniform wall thickness and hollow or partly bounding a space and distinguishing the extruded structure from a solid rod.

In the production of extruded hollow profiles from thermoplastic synthetic resins, and especially in the production of tubes and pipes, it is common to utilize an extrusion head which is provided with a housing defining a passage for the thermoplastic material and a mandrel disposed within this housing and supported therein for defining the inner contour of the extruded strand, the housing and the mandrel together forming a passage from which the strand emerges at the mouth of the extrusion head.

To support the mandrel in the housing, a holder is generally used which has the configuration of a spider, i.e. includes ribs or webs running across the flow path of the synthetic resin material and bridging the housing and the mandrel. Means can also be provided to subdivide this flow path, e.g. in the form of an additional hollow mandrel, and for allowing the two streams to merge proximal to the outlet or mouth and downstream of the mandrel.

In general, the flow cross section of the two coaxial passages on opposite sides of the annular partition will be greater than the flow cross section of the passage extending from this partition to the mouth.

Such extrusion head can be used at the downstream end of a plasticizing and masticating worm for processing the synthetic resin material to be extruded and for developing the high pressures required to drive the material through the head. Within this worm arrangement, the material may be liquefied utilizing added heat or the heat generated by the mastication operation.

Systems of this type are used for the fabrication of thermoplastic thick-wall and large diameter pipe, e.g. from hard polyvinyl chloride.

Because of the fact that the mandrel or mandrels are supported by ribs or webs which split the synthetic resin flow through the passages of the head, the synthetic resin streams emerging at the downstream side of these flow splitters do not fully merge, but rather tend to weld together in pressure-sensitive joints which are visible as markings on the finished product and which represents structural weakenings therein similar to "seams".

To avoid these structural defects, it has already been proposed to provide the head with an imbricated arrangement of such streams so that inner and outer streams overlap one another and hence the "seams" or junctions between in the streams are bridged by outer streams and vice versa.

These techniques have not proved to be fully satisfactory, especially with thick-walled pipe where both markings along seam lines or junction lines and the tendency to rupture preferentially along these lines remain.

It has also been proposed to improve the mixing of the streams after they pass the flow dividers utilizing counter-rotating screw formations of the passage walls, baffle surfaces and the like. While this may have proved to be successful with thin-wall pipe, they have yet to be satisfactorily demonstrated to have the desired results for thick-wall pipe.

It has also been proposed to provide a system in an extrusion head of the type described whereby counter-pressure or back pressure (pressure resisting the forward displacement of the synthetic resin material) will be generated to induce merger of the partial streams.

Reference may be had, specifically, to German patent No. 19 40 195 which discloses such an extrusion head. In this construction, the mandrel is fixed by a holder in the housing and downstream of this holder the flow is divided into two coaxial streams each of which has a closed annular configuration and the sum of the cross sections thereof is greater than the cross section of the subsequent portion of the flow channel where the two streams merge. Because of this reduction in the flow cross section at merger, a back pressure develops which is intended to assist in the blending of the separate streams of resin.

However, even this system did not provide a satisfactory quality of pipe especially for large-diameter pipe and thick-wall pipe.

Furthermore, this system required an extrusion head of inordinate length to be satisfactory even for pipes of smaller wall thicknesses.

OBJECTS OF THE INVENTION

The principal object of this invention is to provide an improved extrusion head whereby the aforementioned disadvantages are obviated.

A more specific object of this invention is to provide an extrusion head particularly for the fabrication of large thick-wall hollow profiles, primarily pipe, in which surface markings are reduced and, more importantly, structural defects resulting from insufficient merger of partial streams of the synthetic resin are eliminated.

Still another object of the invention is to provide an extrusion head for the purposes described with improved blending of partial streams of synthetic resin which may be generated in this head, utilizing an extrusion head of comparatively small length.

SUMMARY OF THE INVENTION

I have found, quite surprisingly, that these objects can be attained in an extrusion head of comparatively small length, i.e. one which is axially short, utilizing the principles of the aforementioned German patent but wherein, additionally, the flow cross section for the synthetic resin material decreases continuously at least from the flow dividers to the mouth of the extrusion head.

More specifically the extrusion head of the invention comprises an inlet, a deflector directing the stream of plastic material outwardly, a holder forming openings which communicate with a pair of coaxial passages defined by the mandrel supported by this holder and extending in the housing along this mandrel, a common passage downstream of the coaxial passages and of a reduced flow cross section by comparison with the sum of the cross sections of the coaxial passages, and a mouth at which the common passage ends, the passages just described being of continuously diminishing flow cross section in the flow direction.

An effective temperature distribution in the passage is ensured when, according to the invention, the extrusion head is so constructed that the flow passage closest to the axis of the mandrel and thus having its outer wall defined by the hollow mandrel portion has a smaller cross section than the remaining cross section of the main channel.

It has also been found to be advantageous to provide the holder with two annular rows of openings in imbricated configuration so that the openings of the outer row lie readily outwardly of flow dividers between the openings of the inner row and the openings of the inner row lie radially inwardly of flow dividers of the openings of the outer row.

According to the invention, the main or common passage has a cross section such that 40% of the back pressure is generated therein while 60% of the back pressure is generated in the divided portion of the flow passage, i.e. where the annular mandrel subdivides the flow into two coaxial streams.

The extrusion head has been found to give a number of advantages. For example, for a given extruded pipe diameter and wall thickness, the extrusion head is less expensive and easier to fabricate than earlier extrusion heads, it is of substantially smaller size and especially axial length so that maintenance problems are reduced, and stabilization problems are likewise eliminated and the extrusion head also allows fabrication of an especially large diameter thick wall pipe. Such pipe could not be produced with extrusion heads of reasonable length heretofore.

It has also been found that the pipe which is produced can be substantially more uniform in character and is free from the structural defects and markings discussed previously.

When each of the two passages have substantially half the height of the main flow passage, the desired flow characteristics and mixing of the streams can be achieved with one fourth to one third the usual passage lengths which were required heretofore and, indeed, when 60% of the back pressure is generated in the partition portion of the flow and the remainder in the common passage downstream thereof, the latter can be reduced by 40 to 45%.

BRIEF DESCRIPTION OF THE INVENTION

Figure 2:
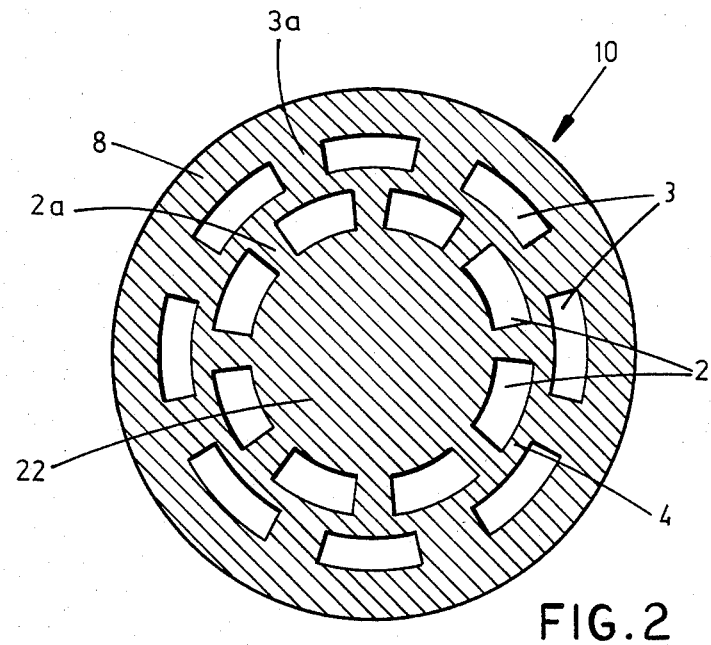

The above and other objects, features and advantages of the present invention will become more readily apparent from the following description, reference being made to the accompanying drawing in which:

FIG. 1 is an axial cross sectional view, somewhat idealized, or in somewhat diagrammatic form, of an extrusion head in accordance with the invention; and FIG. 2 is a section taken along the line II—II of FIG. 1.

SPECIFIC DESCRIPTION

The extrusion head shown in FIGS. 1 and 2 comprises a housing 10 which may be composed of several parts interconnected as is conventional in the art. The housing 10 can have an inlet section 11 which is formed with an axial inlet passage 12 and which abuts the outer portion of a mandrel-holding plate 8 to which it is connected by bolts through this outer portion or any conventional means (not shown). The housing also includes a member 13 which is affixed to the outer portion of the plate 8 and to which another member 14 is provided, the latter defining the outer wall 15 of a common passage 7 which will be described in greater detail hereinafter and which terminates in the mouth 16 at which the tubular synthetic resin strand emerges to harden and constitute the thick-wall pipe.

A mandrel generally represented at 20 is also provided.

The mandrel 20 can comprise a conical member 21 which is pointed into the oncoming synthetic resin stream and deflects the stream uniformly outwardly. The member 21 is affixed by means not shown to the central region 22 of the plate 8 which also forms part of the mandrel 20. The mandrel 20 also comprises a member 23 which defines the inner wall 24 of a flow passage 6, likewise described subsequently and defines the inner wall 25 of a merger passage 26 opening into or continuing as the continuation passage 7. The inner wall 27 of this passage is defined by the terminal member 28 of the mandrel. All of the parts of the mandrel are held together and connected to the central portion 22 of member 8. Thus the mandrel is carried by the plate 8. The mandrel also includes a tubular member or hollow mandrel portion 4 which can be integral with the plate 8 and which can extend to the right from a central zone 8a of the latter, as can be seen from FIG. 1, the synthetic resin is forced from left to right and, after entering the inlet 12, is distributed uniformly outwardly through the conical portion 1 of the flow passage to pass through openings 2 and 3 in concentric rows of the mandrel plate 8, these openings being located in imbricate fashion so that the openings 3, for example, lie directly radially outwardly of the flow dividers 2a between the openings 2 while the openings 2 lie directly radially inwardly of the flow dividers 3a of the openings 3.

Since the mandrel plate also carries the hollow mandrel 4, the main flow passage is divided thereby into coaxial annular passages 5 and 6 of substantially the same height, at least originally, with both having a reducing flow cross section as the flow moves downstream. In this region the pressure in the mass is sharply raised so that over the length of these coaxial passages, at least 60% of the back pressure is developed.

In each of these passages, the respective stream forms a homogeneous tubular flow. Downstream of a mandrel 4, these two tubular streams are united in the main passage 7 and bonded together. Radial merger is not nearly as important as is the peripheral merger of the streams since there is little tendency of the two layers to separate peripherally.

The wall 24 can converge toward the tubular mandrel 4 while the wall 17 of the housing portion 13 can converge toward the mandrel so that the flow cross section through each of the annular passage 5 and 6 diminishes continuously along the length of the mandrel. In the partition passage 26 the walls can also converge toward one another to progressively reduce the cross section still further and the wall 27 can converge toward the wall 15 to progressively reduce the cross section of the common stretch 7. Consequently, at least from the orifices 2,3, the flow cross section continuously decreases to the mouth of the extrusion head.

I claim:

1. An extrusion head for the production of a hollow profile of a thermoplastic material comprising:
a housing formed with an inner mandrel and a hollow mandrel coaxial with said inner mandrel and defining in said housing a flow channel for said material which is annular over its entire length, said flow channel having an annular inlet at one axial end of said housing, an annular divergent portion downstream of said inlet for distributing said material outwardly, a pair of coaxial annular portions communicating with said divergent portion and subdividing said material into two annular streams, and an annular common portion receiving said annular streams and discharging said material in a continuous tubular strand at an annular mouth of said extrusion head at the opposite axial end thereof, said coaxial portions of the flow channel having a combined flow cross section greater than the flow cross section of said common portion, said flow channel progressively narrowing in cross section at least over the entire length thereof from said coaxial portions to said mouth.

2. The extrusion head defined in claim 1 wherein the innermost one of said coaxial portions has a flow cross section less than the remainder of said channel where said channel is formed by said coaxial portions.

3. The extrusion head defined in claim 1, further comprising a plate upstream of said coaxial portion and formed with concentric rows of openings respectively communicating with said coaxial portions of the flow channel.

4. The extrusion head defined in claim 3 wherein said plate carries said hollow mandrel.

5. The extrusion head defined in claim 3 wherein the openings of said rows are disposed in imbricate configuration with each opening radially aligned with a space between openings of the other row.

6. The extrusion head defined in claim 4 wherein the openings of said rows are disposed in imbricate configuration with each opening radially aligned with a space between openings of the other row.

7. The extrusion head defined in claim 6 wherein said plate carries said inner mandrel.

8. The extrusion head defined in claim 7 wherein said mouth is circular.

9. An extrusion head for the production of a hollow profile of a thermoplastic material comprising:
a housing formed with an inner mandrel and a hollow mandrel coaxial with said inner mandrel and defining in said housing a flow channel for said material which is annular over the entire length, said flow channel having an annular inlet at one axial end of said housing, an annular divergent portion downstream of said inlet for distributing said material outwardly, a pair of coaxial annular portions communicating with said divergent portion and subdividing said material into two annular streams, and an annular common portion receiving said annular streams and discharging said material in a continuous tubular strand at an annular mouth of said extrusion head at the opposite axial end thereof, said coaxial portions of the flow channel having a combined flow cross section greater than the flow cross section of said common portion, said flow channel progressively narrowing in cross section at least over the entire length thereof from said coaxial portions to said mouth, said flow channel being dimensioned to generate a back pressure to flow therealong and the portions of said flow channel being respectively dimensioned such that said common portion generates 40% of said back pressure and 60% of said back pressure is generated in said path of coaxial annular portions.

* * * * *